April 9, 1929.  G. B. TAYLOR  1,708,685
ABSORPTION APPARATUS
Filed April 8, 1927
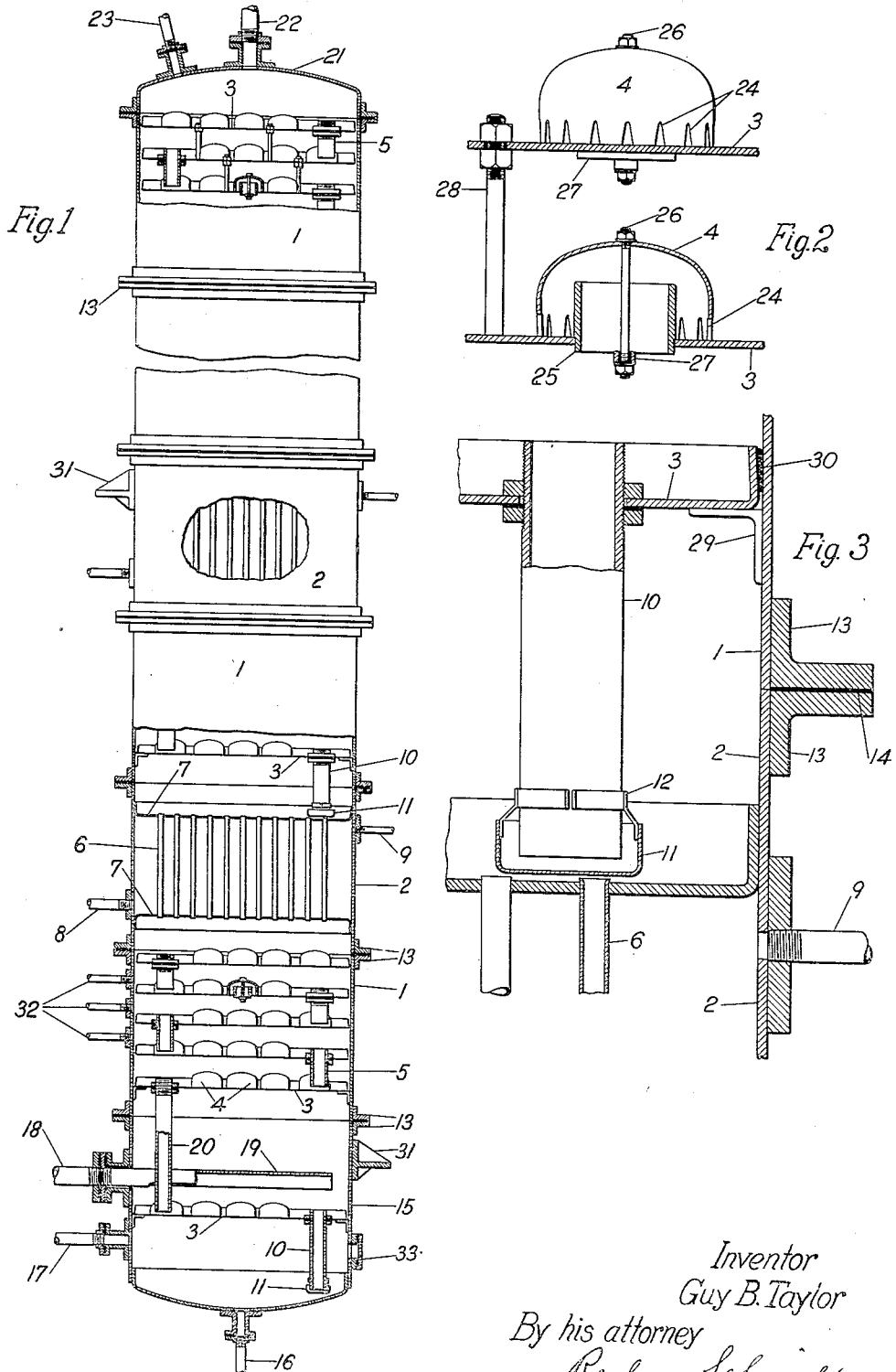
Inventor
Guy B. Taylor
By his attorney
Reuben Schmidt Patented Apr. 9, 1929.

1,708,685

UNITED STATES PATENT OFFICE.

GUY B. TAYLOR, OF WILMINGTON, DELAWARE, ASSIGNOR TO E. I. DU PONT DE NEMOURS & COMPANY, OF WILMINGTON, DELAWARE, A CORPORATION OF DELAWARE.

ABSORPTION APPARATUS.

Application filed April 8, 1927. Serial No. 182,023.

This invention relates to apparatus for carrying out absorption of gas in a liquid when such absorption is carried out under pressure and involves liberation of heat. It relates more particularly to equipment for conducting processes in which absorption is accompanied by chemical reaction either in the liquid phase or in the gas phase, or both, as, for example, the production of nitric acid by absorption, under pressure, of oxides of nitrogen in water from a gas stream containing such oxides.

This apparatus is particularly suitable for carrying out the process of my co-pending application Serial No. 92,701 filed March 6, 1926.

The recovery of oxides of nitrogen as nitric acid by reaction with water is generally carried out in relatively large packed towers, constructed of acid-resistant brick or of granite. The large size of these towers is necessitated by the unique character of the absorption process. In any straight absorption process where solution or some simple chemical reaction is involved (e. g., absorption of ammonia in water or in sulphuric acid), the volume factor does not enter. However, in the conversion of nitrogen oxides to nitric acid by reaction with water, two steps are involved:—

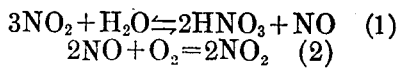

$$3NO_2 + H_2O \rightleftharpoons 2HNO_3 + NO \quad (1)$$
$$2NO + O_2 = 2NO_2 \quad (2)$$

The first is an equilibrium reaction governed by the acid concentration of the absorbing medium and by the temperature. The second is irreversible at the temperatures encountered in absorption practice, but is a time reaction requiring an appreciable time to take place to any marked degree. This time factor accounts for the great size required for nitrogen oxide absorption systems operating at atmospheric pressure.

For the absorption of oxides of nitrogen under pressure, the only system hitherto proposed has been substantially the same as has been used at atmospheric pressure, namely packed towers. The size of the system required is reduced in proportion to the square of the operating pressure, because the pressure has an effect of this order of magnitude on the rate of oxidation of nitric oxide to nitrogen peroxide. For example, a tower operating under ten atmospheres pressure need be only one percent as large as one operating at atmospheric pressure. However, when working at pressures above atmospheric, even though the size of the towers can be greatly reduced, the formation of nitric acid in such apparatus is still a somewhat inefficient operation, and the concentration of the acid produced is generally low. A further objection is the complicated and costly equipment required for carrying out the process. Another objection to the use of packed towers is that the quantity of water added to the absorption system is comparatively small, and uneven distribution of the absorbent is a detrimental result. Recirculation of the absorbing liquid has been proposed, but is a difficult and costly expedient when operating under pressure.

In apparatus assemblies heretofore used, under atmospheric pressures, the removal of the heat of reaction has sometimes been taken care of by natural radiation from the very large surfaces involved. In other cases, the heat of reaction has been taken care of by circulation of the absorption liquid through water cooled coils; usually involving the use of circulating pumps and sometimes requiring refrigeration. However, when pressures are used, the absorption apparatus is so reduced in size, the heat of reaction can not be radiated by the correspondingly small surface entailed; and it becomes necessary to provide other means for the elimination of this heat. It is not feasible to remove this heat by cooling the liquid as it runs from plate to plate in the column, as this involves using expensive, extreme cooling by artificial refrigeration. This is because of the relatively small volume and small heat capacity of the liquid.

Furthermore, the nitric acid produced by absorption of nitric oxides in water, is generally more or less highly colored yellow due to incomplete oxidation and it has been customary to treat this highly colored acid in a separate operation and by use of separate equipment in which the acid is bleached by blowing with air.

I have invented a unitary apparatus assembly suitable for carrying out under pressure, gas absorptions involving the liberation of heat, such apparatus avoiding the objections of the prior art. This equipment is especially suitable for the absorption of oxides of nitrogen under pressure and conversion of these to uncolored nitric acid. Such apparatus comprises a vertical tower complete in a single unit, composed of a series of superposed sections adapted for absorption of the gases and for regulated cooling of the gases at suitable intervals with means for bleaching the resulting product. In the present apparatus, the heat of reaction is removed from the gas stream by cooling the gas itself with ordinary temperature water, or other medium, instead of by artificial refrigeration.

The invention is shown in more or less detail in the accompanying drawings in which Figure 1 is a diagrammatic view showing substantially the complete assemblage, some of the parts being shown in section and some in elevation;

Figure 2 is a detail view, partly in section and partly in elevation, of portions of successive absorption trays; and Figure 3 is a detail view, partly in section and partly in elevation, showing the construction of the liquid seals placed on certain of the liquid transfer pipes.

In the drawings, the absorption tower is shown substantially as a whole in Fig. 1. The tower comprises a number of alternating absorption and cooling sections 1 and 2 respectively. The absorption sections comprise a plurality of bubbler cap trays 3, containing bubbler caps 4, mounted thereon and having overflow pipes 5 for conducting liquid to the next lower tray.

Cooling sections 2 have vertical cooling tubes 6, fastened at their ends, in tube sheets 7. The tube sheets 7 are riveted, bolted or welded in place in any suitable manner in order to form a sufficiently tight connection. The space between tube sheets 7 forms a cooling chamber through which a cooling medium may be passed by means of cooling fluid supply line 8 and outlet line 9. The overflow pipe attached to the bottom bubbler cap tray in an absorption section which is above a cooling section is provided with an overflow pipe 10, having a cup 11, at its lower end to provide a liquid seal. This cup 11 may be supported on pipe 10 by any suitable means, such as spider 12 (Fig. 3). The successive sections are provided with suitable flanges 13 between which is placed suitable packing 14, thereby making a pressure-tight joint. Overflow pipes 5 and 10 extend upwardly through trays 3 and are kept in place by some suitable means, such as nuts or the like.

The lowermost section 15 of the tower is a combination reaction and bleaching zone. It is provided with a bubbler cap tray 3, having overflow pipe 10, provided with liquid seal cup 11, as described. At or near the bottom of section 15 is placed suitable liquid outlet pipe 16. At a suitable point in the side of this section is placed air, or other oxygen-containing gas inlet pipe 17 arranged to discharge below the bubbler cap tray 3. Gas inlet 18 enters section 15 at a point above the bubbler cap tray and is provided with a distributor 19. The lowermost tray in the absorption section above section 15 is provided with overflow pipe 20, which pipe is of sufficient length to extend into the bubbler cap tray in section 15.

The top of the column is closed off by head section 21, which is provided with gas outlet 22 and water, or other absorption liquid inlet 23.

In Figs. 2 and 3 are shown some of the details of the bubbler cap trays and the cooling sections. The bubbler caps 4 are provided with suitable notches 24 in their edges. The caps are held in place over a central well 25 by means of suitable bolts 26 passing through the tops of the caps and holding the caps in place by means of crossbars 27. The upper trays in the absorption sections are provided with depending supports 28 which rest upon the next lower tray and function as spacers and supporters. The lowermost tray in each section is supported by brackets 29, shown in detail in Fig. 3. Between the side edges of the bubbler cap trays and the side walls of the absorption sections is placed suitable packing 30, also shown in detail in Fig. 3. Suitable supporting feet 31 are placed on the outside of the various sections at proper intervals to maintain the tower in position on a suitable framework or the like (not shown). The absorption sections may be provided with inlets 32 for suitable absorbing liquid. Suitable handholes 33 may be placed at suitable points in any or all of the sections to permit access to the interior of the several sections without necessitating dismantling the apparatus.

The absorption tower and the sections which make it up are usually circular in cross section, but may be made in any suitable shape. The cooling sections and the absorption sections are generally made of the same exterior dimensions, in order that they may be interchangeable and may be combined in any desirable manner in order to provide for proper absorption and removal of the excess heat of reaction. It is also well to provide each of the sections with independent means of support, such as feet 31, so as to permit ready interchange of sections. The apparatus is made of any suitable metal and is preferably of a metal resistant to the chemicals present in the particular process for which the apparatus is being used. For instance, when used for the manufacture of nitric acid, an acid resistant alloy of chromium and iron is highly satisfactory and desirable. The various pipe connections shown are furnished with suitable valves (not shown) capable of withstanding high pressure, and suitable pressure reducing valves (not shown) are used where desirable.

The apparatus may be used for carrying out any suitable absorption operation and is particularly adapted to such operations entailing chemical reactions which liberate heat. As has been pointed out, it is suitable for the oxidation of nitric oxide to form nitrogen dioxide and the absorption of nitrogen dioxide to form nitric acid under pressure. This process will be described to illustrate the operation of the apparatus, but its use is not limited to this one process.

The bubbler cap trays 3 having been filled with a suitable absorption medium, such as water, dilute nitric acid or the like, nitrogen oxide gases under pressure from any suitable source are brought into section 15 of the apparatus by means of inlet 18 and distributor 19. These gases may come from a process of oxidizing ammonia under pressure, or from any other suitable source. These gases then pass upwardly through the wells 25 in the lowermost tray 3 and pass out through notches 24 in the caps 4 and bubble through the liquid on tray 3. In this first tray the nitrogen dioxide is absorbed according to reaction (1) shown above. In the space between the trays, reaction (2) takes place and the nitric oxide in the gas is oxidized to nitrogen dioxide. Absorption of the nitrogen dioxide then takes place in the next tray and so on up the tower. After several of these absorption and oxidation steps, the heat of reaction has raised the temperature to such an extent that cooling of the gases is desirable. At this point the gases are passed through tubes 6 in the first cooling section 2 and these tubes are cooled externally by passing through this cooling section any suitable cooling medium such as water, air, gas or the like. The cooling medium passes through inlet 8, around the tubes 6 and out through outlet 9. The cooled gases passing out of the tubes are then submitted to further absorption and oxidation operations with cooling steps when necessary. The reactions are carried on until the gases are stripped of substantially all of their nitrogen oxide content and the waste gases remaining pass out of the tower through gas outlet 22 at the top of the tower, suitable pressure reducing means (not shown) being used to release the pressure of the exit gases.

It is understood that the entire operation taking place in the interior of the reaction tower is carried out under suitable pressures substantially above atmospheric, the tower being designed and constructed to take care of these pressures without any substantial leakage. Any suitable pressures may be used, but in carrying out the nitric acid process, for instance, it has been found that 75 to 150 pounds per square inch above atmospheric are very satisfactory. From time to time or continuously, as is found necessary, water is fed into the top of the tower through inlet 23, connected to a suitable source under pressure (not shown). As the water is fed into the top section the pool of liquid upon the top tray 3 overflows through overflow pipe 5 into the next lower tray. In time this tray will overflow and successively down to the bottom section where the final overflow will be taken care of by removing the strong acid at the bottom. The overflow pipes 5 are arranged to extend above the surface of the trays 3 and thereby regulate the height of the liquid level on such trays. The upstanding portions of pipes 5, however, do not extend as much above the base of trays 3 as do the wells 25. The lower ends of overflow pipes 5 are arranged to extend somewhat below the level of the liquid on the next lower tray. This forms a liquid seal and insures the upcoming gases passing through the bubbler caps and prevents their passage through the pipes 5. As has been described, the lowermost tray of any of the absorption sections, which is immediately above a cooling section, is furnished with overflow pipe 10 having at its end a cup 11 to provide the desired liquid seal. The liquid from the tray 3 overflows into pipe 10 and fills cup 11, eventually overflowing this cup and passing downwardly. However, so long as this cup remains filled with liquid, the lower end of pipes 10 are sealed off and passage of gas therethrough is prevented. Placed below the gas inlet 18 and distributor 19 is a single bubbler cap tray 3 upon which the strong acid formed in the upper portions of the tower and fed to this tray through overflow pipe 20, is bleached by the passage of air or other oxygen-containing gas through the bubbler caps, said gas coming into the apparatus below this tray 3 through inlet 17. This gas in bubbling through the acid bleaches it and the remaining oxygen reacts with the nitric oxide in the gases coming through 19 to form nitrogen dioxide as previously described. The bleached acid overflows through overflow pipe 10 and its liquid seal 11, being drawn off from a low point in the tower by means of acid drawoff line 16.

While the apparatus has been described particularly with reference to its use in the manufacture of nitric acid under pressure, it is understood that it is not limited only to acid formation. Likewise, details of construction of the apparatus may be varied widely without departing from the scope of the invention. Various changes may be made in the materials of construction, number of respective sections used, arrangement of the sections with respect to each other, liquid and gas flows and the like, since it is understood that I do not limit myself to the above embodiments except as indicated in the appended claims.

I claim:

1. Apparatus for conducting exothermic absorption processes under pressure which comprises a substantially vertical tower having gas-tight joints and being capable of withstanding pressures substantially above atmospheric, said tower comprising a bottom section having a liquid outlet placed at a low point in said section and a gas inlet above said liquid outlet, a top section having a gas outlet and a liquid inlet, and a plurality of superimposed intermediate absorbing sections and alternating cooling sections, the absorption sections having a plurality of horizontal bubbler cap trays, each tray having an overflow pipe discharging through a liquid seal and a plurality of liquid-sealed bubbler caps arranged to allow upward passage of gas, the cooling sections having a plurality of vertical cooler tubes connected at their ends by gas-tight joints in horizontal tube sheets and having means for passing cooling medium in contact with the exterior of said tubes.

2. Apparatus for the formation of nitric acid under pressure from oxides of nitrogen which comprises a substantially vertical tower of acid resistant metal, having gas-tight joints and being capable of withstanding pressures substantially above atmospheric, said tower comprising a bottom section having a liquid outlet placed at a low point in said section, an oxygen-containing gas inlet above said liquid outlet, a bleacher tray above said air inlet and a gas inlet above said bleacher tray, a top section having a gas outlet and a liquid inlet, and a plurality of superimposed intermediate absorbing sections and alternating cooling sections, the absorption sections having a plurality of horizontal bubbler cap trays, each tray having an overflow pipe discharging through a liquid seal and a plurality of liquid-sealed bubbler caps arranged to allow upward passage of gas, the cooling sections having a plurality of vertical cooler tubes connected at their ends by gas-tight joints in horizontal tube sheets and having means for passing cooling medium in contact with the exterior of said tubes.

3. Apparatus for the formation and absorption of nitric acid under pressure from oxides of nitrogen which comprises a substantially vertical tower of acid resistant metal, having gas-tight joints and being capable of withstanding pressure substantially above atmospheric, said tower comprising a bottom section having a liquid outlet placed at a low point in said section and a gas inlet above said liquid outlet, a top section having a gas outlet and a liquid inlet, and a plurality of superimposed intermediate absorbing sections and alternating cooling sections, the absorption sections having a plurality of horizontal bubbler cap trays, each tray having an overflow pipe discharging through a liquid seal and a plurality of liquid-sealed bubbler caps arranged to allow upward passage of gas, the cooling sections having a plurality of vertical cooler tubes connected at their ends by gas-tight joints in horizontal tube sheets and having means for passing cooling medium in contact with the exterior of said tubes.

In testimony whereof I affix my signature.

GUY B. TAYLOR.